(12) United States Patent
Kleinau et al.

(10) Patent No.: US 10,389,289 B2
(45) Date of Patent: Aug. 20, 2019

(54) GENERATING MOTOR CONTROL REFERENCE SIGNAL WITH CONTROL VOLTAGE BUDGET

(71) Applicant: STEERING SOLUTIONS IP HOLDING CORPORATION, Saginaw, MI (US)

(72) Inventors: Julie A. Kleinau, Bay City, MI (US); Siddharth Ballal, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 0 days.

(21) Appl. No.: 14/614,016

(22) Filed: Feb. 4, 2015

(65) Prior Publication Data

US 2015/0222210 A1 Aug. 6, 2015

Related U.S. Application Data

(60) Provisional application No. 61/936,387, filed on Feb. 6, 2014.

(51) Int. Cl.
| | |
|---|---|
| *B60L 15/02* | (2006.01) |
| *H02P 1/00* | (2006.01) |
| *H02P 21/22* | (2016.01) |
| *H02P 6/00* | (2016.01) |
| *H02P 7/00* | (2016.01) |

(52) U.S. Cl.
CPC ............... *H02P 21/22* (2016.02); *H02P 6/00* (2013.01); *H02P 7/00* (2013.01)

(58) Field of Classification Search
CPC ......... H02P 6/142; H02P 21/22; B60L 15/025
USPC .............. 318/400.02, 807, 808, 400.15
See application file for complete search history.

(56) References Cited

U.S. PATENT DOCUMENTS

| | | |
|---|---|---|
| 4,713,596 A | 12/1987 | Bose |
| 4,733,149 A | 3/1988 | Culberson |
| 4,920,306 A | 4/1990 | Mard et al. |
| 5,196,778 A | 3/1993 | Hayashida |
| 5,223,775 A | 6/1993 | Mongeau |
| 5,410,234 A | 4/1995 | Shibata et al. |

(Continued)

FOREIGN PATENT DOCUMENTS

| | | |
|---|---|---|
| CN | 1675099 A | 9/2005 |
| CN | 1741368 A | 3/2006 |

(Continued)

OTHER PUBLICATIONS

F. Briz, M.W. Degner and R.D. Lorenz; "Analysis and Design of Current Regulators Using Complex Vectors"; IEEE Industry Applications Society; Annual Meeting; New Orleans, Louisiana; Oct. 5-9, 1997; pp. 1504-1511.

(Continued)

*Primary Examiner* — Eduardo Colon Santana
*Assistant Examiner* — Cortez M Cook (57) ABSTRACT

A method of controlling a motor in a motor control system is provided. The method determines a control voltage budget value based on an operating region of the motor. The method adjusts a supply voltage signal based on the control voltage budget value. The method determines a motor voltage command based on the adjusted supply voltage signal. The method applies a voltage corresponding to the motor voltage command to the motor in order to generate a desired motor torque.

20 Claims, 4 Drawing Sheets

(56) References Cited

U.S. PATENT DOCUMENTS

| | | | |
|---|---|---|---|
| 5,652,495 A | 7/1997 | Narazaki et al. | |
| 5,927,430 A | 7/1999 | Mukai et al. | |
| 5,962,999 A | 10/1999 | Nakamura et al. | |
| 6,002,234 A | 12/1999 | Ohm et al. | |
| 6,021,251 A * | 2/2000 | Hammer | H02P 7/2913 318/432 |
| 6,104,148 A * | 8/2000 | Kumar | B60L 3/10 303/151 |
| 6,152,254 A | 11/2000 | Phillips | |
| 6,161,068 A | 12/2000 | Kurishige et al. | |
| 6,222,334 B1 | 4/2001 | Tamagawa et al. | |
| 6,288,515 B1 | 9/2001 | Hiti et al. | |
| 6,370,459 B1 | 4/2002 | Phillips | |
| 6,465,975 B1 | 10/2002 | Naidu | |
| 6,499,559 B2 | 12/2002 | McCann et al. | |
| 6,605,912 B1 | 8/2003 | Bharadwaj et al. | |
| 6,700,342 B2 | 3/2004 | Hampo et al. | |
| 6,900,607 B2 | 5/2005 | Kleinau et al. | |
| 7,034,493 B2 | 4/2006 | Yoshimoto et al. | |
| 7,071,649 B2 | 7/2006 | Shafer et al. | |
| 7,145,310 B2 | 12/2006 | Ihm et al. | |
| 7,199,549 B2 | 4/2007 | Kleinau et al. | |
| 7,207,412 B2 | 4/2007 | Uryu | |
| 7,394,214 B2 | 7/2008 | Endo et al. | |
| 7,548,035 B2 | 6/2009 | Endo et al. | |
| 7,576,506 B2 | 9/2009 | Kleinau et al. | |
| 7,952,308 B2 | 5/2011 | Schulz et al. | |
| 8,633,766 B2 | 1/2014 | Khlat et al. | |
| 8,896,244 B2 | 11/2014 | Kleinau | |
| 8,952,637 B2 | 2/2015 | Suzuki | |
| 2002/0175649 A1 | 11/2002 | Reutlinger | |
| 2003/0076065 A1 | 4/2003 | Shafer et al. | |
| 2003/0146041 A1 | 8/2003 | Kanda | |
| 2004/0095089 A1 | 5/2004 | Collier-Hallman | |
| 2004/0195993 A1 | 10/2004 | Yoshimoto et al. | |
| 2005/0073280 A1 | 4/2005 | Yoshinaga et al. | |
| 2006/0000209 A1 | 1/2006 | Tsuda et al. | |
| 2006/0100766 A1 | 5/2006 | Schwarz et al. | |
| 2006/0113929 A1 * | 6/2006 | DeLange | G01J 1/04 318/63 |
| 2006/0122751 A1 | 6/2006 | Oyama et al. | |
| 2006/0145639 A1 | 7/2006 | Song et al. | |
| 2007/0043490 A1 | 2/2007 | Yokota et al. | |
| 2007/0046126 A1 | 3/2007 | Sagoo et al. | |
| 2007/0103105 A1 | 5/2007 | Endo et al. | |
| 2007/0132446 A1 | 6/2007 | Kleinau et al. | |
| 2007/0177314 A1 | 8/2007 | Weng et al. | |
| 2007/0278032 A1 | 12/2007 | Sakaguchi et al. | |
| 2008/0067960 A1 | 3/2008 | Maeda et al. | |
| 2008/0167779 A1 | 7/2008 | Suzuki | |
| 2008/0191656 A1 | 8/2008 | Satake et al. | |
| 2008/0265808 A1 | 10/2008 | Sparey et al. | |
| 2009/0026994 A1 | 1/2009 | Namuduri et al. | |
| 2009/0027000 A1 | 1/2009 | Gallegos-Lopez et al. | |
| 2009/0069979 A1 | 3/2009 | Yamashita et al. | |
| 2009/0114470 A1 | 5/2009 | Shimizu et al. | |
| 2009/0115362 A1 * | 5/2009 | Saha | B60L 15/025 318/400.09 |
| 2009/0189555 A1 * | 7/2009 | Chen | H02P 21/0089 318/400.07 |
| 2009/0224710 A1 | 9/2009 | Mir | |
| 2009/0234538 A1 | 9/2009 | Ta et al. | |
| 2009/0267555 A1 | 10/2009 | Schulz et al. | |
| 2010/0140003 A1 | 6/2010 | Saha et al. | |
| 2010/0153162 A1 | 6/2010 | Tam et al. | |
| 2010/0231148 A1 * | 9/2010 | Tobari | H02P 6/08 318/400.02 |
| 2011/0018281 A1 | 1/2011 | Tan et al. | |
| 2011/0127934 A1 | 6/2011 | Suzuki | |
| 2011/0156632 A1 * | 6/2011 | Cheng | H02P 27/047 318/808 |
| 2011/0169432 A1 * | 7/2011 | Dean | H02P 7/2805 318/3 |
| 2011/0175556 A1 * | 7/2011 | Tobari | H02P 21/05 318/400.02 |
| 2011/0204833 A1 | 8/2011 | Santo et al. | |
| 2011/0231066 A1 | 9/2011 | Ohno et al. | |
| 2011/0297475 A1 | 12/2011 | Taniguchi et al. | |
| 2011/0309781 A1 | 12/2011 | Tomigashi | |
| 2012/0112549 A1 | 5/2012 | Perisic et al. | |
| 2012/0221208 A1 | 8/2012 | Kojo et al. | |
| 2012/0313701 A1 | 12/2012 | Khlat et al. | |
| 2013/0013154 A1 | 1/2013 | Aoki | |
| 2013/0154524 A1 | 6/2013 | Kleinau | |
| 2013/0187579 A1 | 7/2013 | Rozman et al. | |
| 2013/0261896 A1 | 10/2013 | Gebregergis et al. | |
| 2013/0285591 A1 | 10/2013 | Suzuki | |
| 2014/0191699 A1 | 7/2014 | Dixon | |
| 2014/0239860 A1 * | 8/2014 | Kleinau | H02P 21/22 318/400.14 |
| 2014/0265961 A1 | 9/2014 | Gebregergis et al. | |
| 2014/0265962 A1 | 9/2014 | Gebregergis et al. | |
| 2014/0285129 A1 | 9/2014 | Maeda | |
| 2014/0375239 A1 | 12/2014 | Kim et al. | |
| 2015/0069941 A1 | 3/2015 | Iwaji et al. | |
| 2015/0155811 A1 | 6/2015 | Merienne | |
| 2015/0194919 A1 | 7/2015 | Merienne et al. | |
| 2015/0372623 A1 | 12/2015 | Pramod et al. | |
| 2016/0056745 A1 | 2/2016 | Ootake et al. | |

FOREIGN PATENT DOCUMENTS

| | | |
|---|---|---|
| CN | 101218146 A | 7/2008 |
| CN | 101399516 A | 4/2009 |
| CN | 101456429 A | 6/2009 |
| CN | 101615791 A | 12/2009 |
| CN | 101981804 A | 2/2011 |
| CN | 102570476 A | 7/2012 |
| CN | 102582679 A | 7/2012 |
| CN | 102751936 A | 10/2012 |
| EP | 1378419 A2 | 1/2004 |
| EP | 1720242 A1 | 11/2006 |
| EP | 1768252 A1 | 3/2007 |
| EP | 1914878 A2 | 4/2008 |
| EP | 2003010 A2 | 12/2008 |
| EP | 2293428 A1 | 3/2011 |
| JP | 2000108916 A | 4/2000 |
| JP | 2001247049 A | 9/2001 |
| JP | 2003170850 A | 6/2003 |
| JP | 2007137272 A | 6/2007 |
| JP | 2008143200 A | 6/2008 |
| JP | 2012224258 A | 11/2012 |
| WO | 2014006329 A2 | 1/2014 |

OTHER PUBLICATIONS

Kirtley, J.; "6.061 Introduction to Electric Power Systems, Class Notes Chapter 12 Permanent Magnet 'Brushless DC'" Motors, Massachussetts Institute of Technology, Department of Electrical Engineering and Computer Science, Spring 2011.

L. Harnefors, et al., "Model-Based Current Control of AC Machines Using the Internal Model Control Method", IEEE Transactions on Industry Applications, vol. 34, No. 1, Jan./Feb. 1998, pp. 133-141.

Jeong et al., "Fault Detection and Fault-Tolerant Control of Interior Permanent-Magnet Motor Drive System for Electric Vehicle", IEEE Transactions on Industry Applications, vol. 41, No. 1, Jan./Feb. 2005, pp. 46-51.

Li Yituo et al., PMSM current harmonics suppression based on feedforward compensation, Journal of Tsinghua University (Science and Technology), Mar. 2012, vol. 52, No. 3, Beijing, China, English Abstract, 1 page.

A. Madani, et al.,"Reduction of Torque Pulsations by Inductance Harmonics Identification of a Permanent-Magnet Synchronous Machine", IEEE, Sep. 28, 1995, p. 1-6.

European Patent Search; International Application No. EP14158556; International Filing Date: Jan. 8, 2017; dated Jul. 31, 2017; 9 pages.

European Patent Search; International Application No. EP14158559; International Filing Date: Jan. 8, 2017; dated Aug. 1, 2017; 7 pages.

(56) References Cited

OTHER PUBLICATIONS

European Search Report cited in Application No. 13 160 793.9 dated May 2, 2017, 11 pgs.
European Office Action cited in Application No. 13 160 793.9 dated Jun. 27, 2018, 5 pgs.

* cited by examiner

GENERATING MOTOR CONTROL REFERENCE SIGNAL WITH CONTROL VOLTAGE BUDGET

CROSS-REFERENCES TO RELATED APPLICATIONS

This patent application claims priority to U.S. Provisional Patent Application Ser. No. 61/936,387, filed Feb. 6, 2014, which is incorporated herein by reference in its entirety.

BACKGROUND OF THE INVENTION

Current mode control of a brushless motor is widely used in many industries and products. Some conventional motor control system creates an error signal by comparing a current reference signal and a measured current signal, and uses the error signal to adjust the voltage applied to a brushless motor using a voltage supply inverter. Some of the motor control systems utilize reference current signals for both the q (quadrature) and d (direct) axes of the motor, in order to utilize a minimum amount of motor current for a given motor torque command, motor velocity, and supply voltage. The minimum current reference command is used as the input to a feedback current control loop, where the measured current(s) are subtracted from the reference current(s) to generate error signals used within a PI (proportional-integral), PID (proportional-integral-derivative), or other control loop structure. However, the minimum current reference command may cause performance degradation when the control systems operate near the supply voltage limit.

SUMMARY OF THE INVENTION

In one embodiment of the invention, a method of controlling a motor in a motor control system is provided. The method determines a control voltage budget value based on an operating region of the motor. The method adjusts a supply voltage signal based on the control voltage budget value. The method determines a motor voltage command based on the adjusted supply voltage signal. The method applies a voltage corresponding to the motor voltage command to the motor in order to generate a desired motor torque.

In another embodiment of the invention, a motor control system is provided. The system comprises a motor and a control module. The control module is configured to determine a control voltage budget value based on an operating region of the motor. The control module is further configured to adjust a supply voltage signal based on the control voltage budget value. The control module is further configured to determine a motor voltage command based on the adjusted supply voltage signal. The control module is further configured to apply a voltage corresponding to the motor voltage command to the motor in order to generate a desired motor torque.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The minimum current reference command discussed above is used as the input to a feedback current control loop of a motor control system, where the measured current(s) are subtracted from the reference current(s) to generate error signals used within a PI (proportional-integral), PID (proportional-integral-derivative), or other control loop structure. If the voltage required to produce the reference current command requires all of the available supply voltage, there will not be any remaining supply voltage to be used by the feedback portion of the control system. This changes the dynamics of the control system, with potential detrimental effects on bandwidth and stability/noise. Specifically, without any remaining supply voltage, closed current loop of current mode control dynamics are adversely affected. This may lead to noise and oscillations and leave no margin for an added ripple cancellation command. This in turn leads inaccurate errors signals.

Embodiments of the invention maintain a control voltage budget for operation of a closed loop feedback control. In some embodiments, a constant value of supply voltage may be preserved by subtracting that constant value from the measured supply voltage signal before calculation of the optimal reference current command. This will result in reference commands for the feedback control loop, which do not require the full supply voltage, to achieve a desired motor torque generated by the motor. The reference commands in this case would utilize more motor current, or a larger voltage phase angle, to achieve the desired torque.

When utilizing a constant control voltage budget throughout the motor operating space including areas where the control does not need to operate near the supply voltage limit, the reference command solution represents more motor current than required to deliver the specified torque. This may not be desirable for several reasons, including supply current use efficiency and motor thermal performance.

In some embodiments of the invention, a motor operating range is considered. A control voltage budget value is calculated based on an operating region of the motor control (at least one of motor quadrant, motor velocity, and motor load) in order to retain some of the available supply voltage. The budget value may be set to zero volts when not operating near the supply voltage limit. The budget value may be set to an appropriate value when operating near that voltage limit. The budget value is calibratable for the motor velocity, operational quadrant, and motor load.

Figure 1:
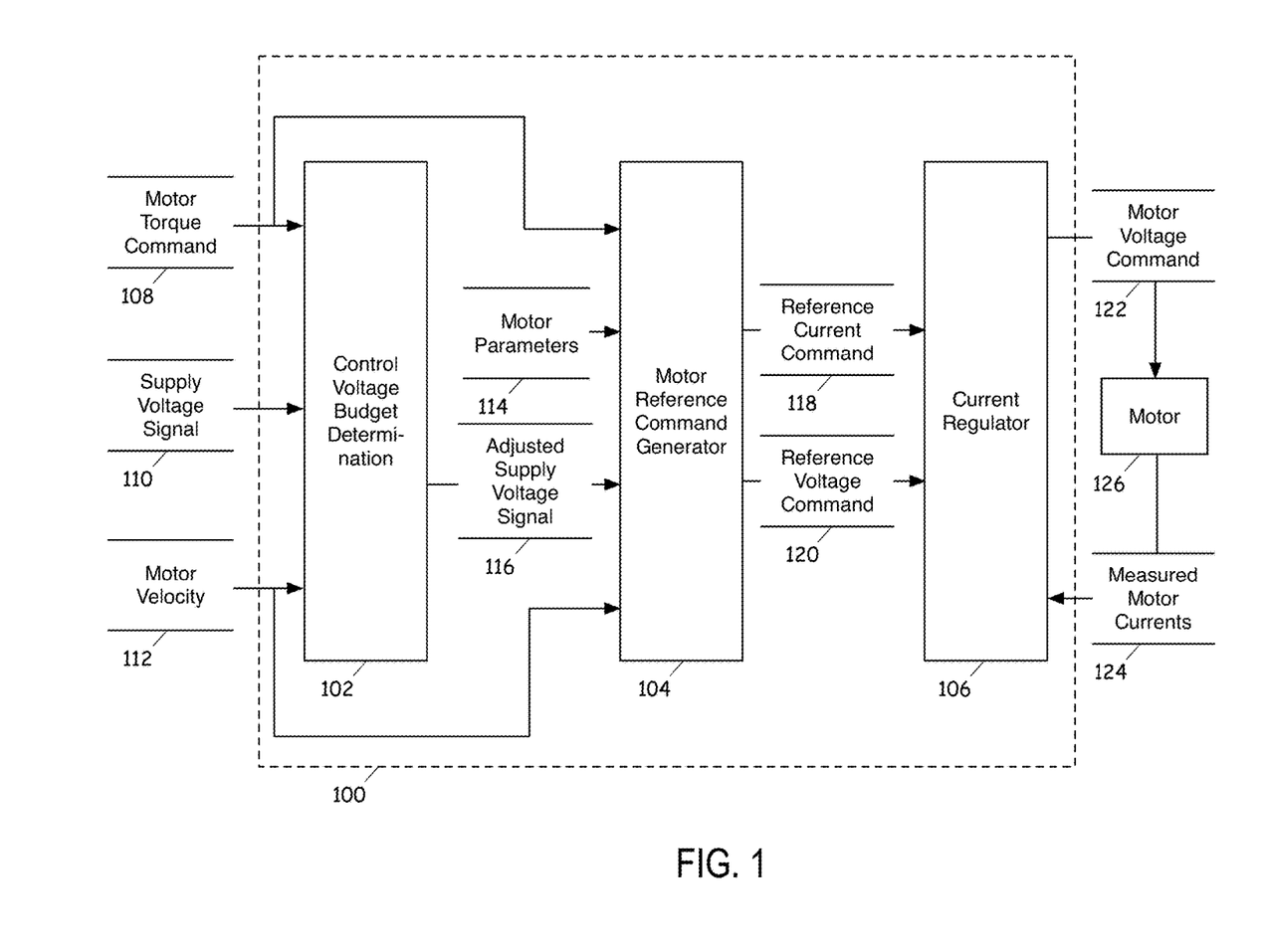
FIG. 1 depicts a schematic diagram of a motor control system in accordance with exemplary embodiments of the invention.

FIG. 1 depicts a block diagram of a motor control system 100 for an electric motor (e.g., DC (direct current) brushless motor, a PMSM (permanent magnet synchronous machine), etc.) utilizing phase current measurements in a current control feedback loop in accordance with some embodiments of the invention. As shown, the motor control system 100 includes a control voltage budget determination module 102, a motor reference command generator module 104, and a current regulator module 106. FIG. 1 also depicts a motor 126. As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in FIG. 1 may be combined and/or further partitioned.

The control voltage budget determination module 102 determines a control voltage budget value based on at least one of a motor quadrant, the motor velocity signal 112, and a motor load. A motor quadrant, in some embodiments, is a number between one and four that represents the relationship between the motor torque command 108 and the motor velocity signal 112, and is described in detail further below with reference to FIG. 3. The control voltage budget determination module 102 adjusts the supply voltage signal 110 based on the determined control voltage budget value. Specifically, in some embodiments, the control voltage budget value determination module 102 adjusts the supply voltage signal 110 by subtracting the determined control voltage budget value from the supply voltage signal 110. The control voltage budget determination module 102 supplies the adjusted supply voltage signal 116 to the motor reference command generator module 104. The control voltage determination module 102 will be described below in more detail with reference to FIG. 2.

The motor reference command generator module 104 generates a reference current command 118 and optionally a reference voltage command 120 based on input signals, including the motor torque command 108, the motor velocity signal 112, the adjusted supply voltage signal 116, and motor parameters 114. The motor torque command 108 represents a commanded torque value, and may be derived from another motor control system (not shown), or may correspond to a torque value generated by, for example, an operator of a vehicle by turning a hand wheel of the vehicle. The motor velocity signal 112 is an angular speed of the motor 126 measured by a speed sensor (not shown). The speed sensor may include, for example, an encoder and a speed calculation circuit for calculating the angular speed of a rotor of the motor 126 based on a signal received by the encoder.

The adjusted supply voltage signal 116 represents a bridge voltage from a direct current (DC) power source (not shown) that is adjusted by the control voltage determination module 102, as described above. The motor reference command generator module 104 treats the adjusted supply voltage signal 116 as the bridge voltage from the DC power source. The motor parameters 114 are estimated values for the motor 126, including, for example, a motor constant ($K_e$), a motor circuit resistance (R), a direct axis inductance ($L_d$) and a quadrature axis inductance ($L_q$). $K_e$ is the motor voltage constant (Voltage/Radian/second). R is the motor circuit resistance, including the motor stator and controller hardware (Ohms). $L_q$ and $L_d$ are the stator quadrature-axis (q-axis) and direct-axis (d-axis) inductances, respectively (Henries).

In some embodiments, the reference current command 118 generated by the motor reference command generator module 104 includes a reference d-axis current command and a reference q-axis current command. The motor reference command generator module 104 may also calculate the reference voltage command 120 optionally, which may include a reference d-axis voltage command and a reference q-axis voltage command. The reference current command 118 and the reference voltage command 120 satisfy the motor torque command 108.

The current regulator module 106 determines a motor voltage command 122 based on the reference current command 118, the reference voltage command 120, and the measured motor currents 124. The measured motor currents 124 include a measured d-axis current and a measured q-axis current. In some embodiments, the current regulator module 106 calculates the discrepancy between the reference d-axis current command and the measured d-axis current as well as the discrepancy between the reference q-axis current command and the measured q-axis current. The current regulator module 106 uses the calculated discrepancies to determine the motor voltage command 122, which include a d-axis voltage command and a q-axis voltage command.

The current regulator module 106 applies a motor voltage according to the motor voltage command 122 to the motor 126 in order to control the motor. Specifically, in some embodiments, a polar conversion controller (not shown) receives as inputs the d-axis voltage command and the q-axis voltage command. Based on the inputs, the polar conversion controller determines a voltage command and a phase advance angle. A PWM (pulse-width modulation) inverter controller (not shown) then receives as input signals the voltage command and the phase advance angle from the polar conversion controller. The PWM inverter controller also receives a rotor angle value of the motor 126 measured by a motor position sensor (not shown). In some embodiments, the PWM inverter controller may include an over-modulation space vector PWM unit that generates three respective duty cycle values. The duty cycle values are used to drive gate drive circuits of an inverter (not shown) that energize phases of the motor 126.

For feedback control purposes, the current regulator module 106 receives measured motor currents 124 from the motor 126. Phase current measurement sensors (no shown) measure two phase currents drawn by the motor 126. The measured motor currents 124 therefore represent the values of the two phase currents measured by the measurement sensors. In some embodiments, the measured values for the AC current are converted into equivalent measured DC current components, which are a measured d-axis current and a measured q-axis current in the d-q reference frame.

The embodiments of the invention are described with an assumption that the motor 126 is a DC brushless motor. However, some embodiments of the invention may be extended to use a DC brush motor through use of a different reference model. In these embodiments, the control voltage budget determination module 102 sets the control voltage budget value to a constant value instead of having the control voltage budget depend from the motor velocity as a DC brush motor does not always have a motor velocity signal available.

Figure 2:
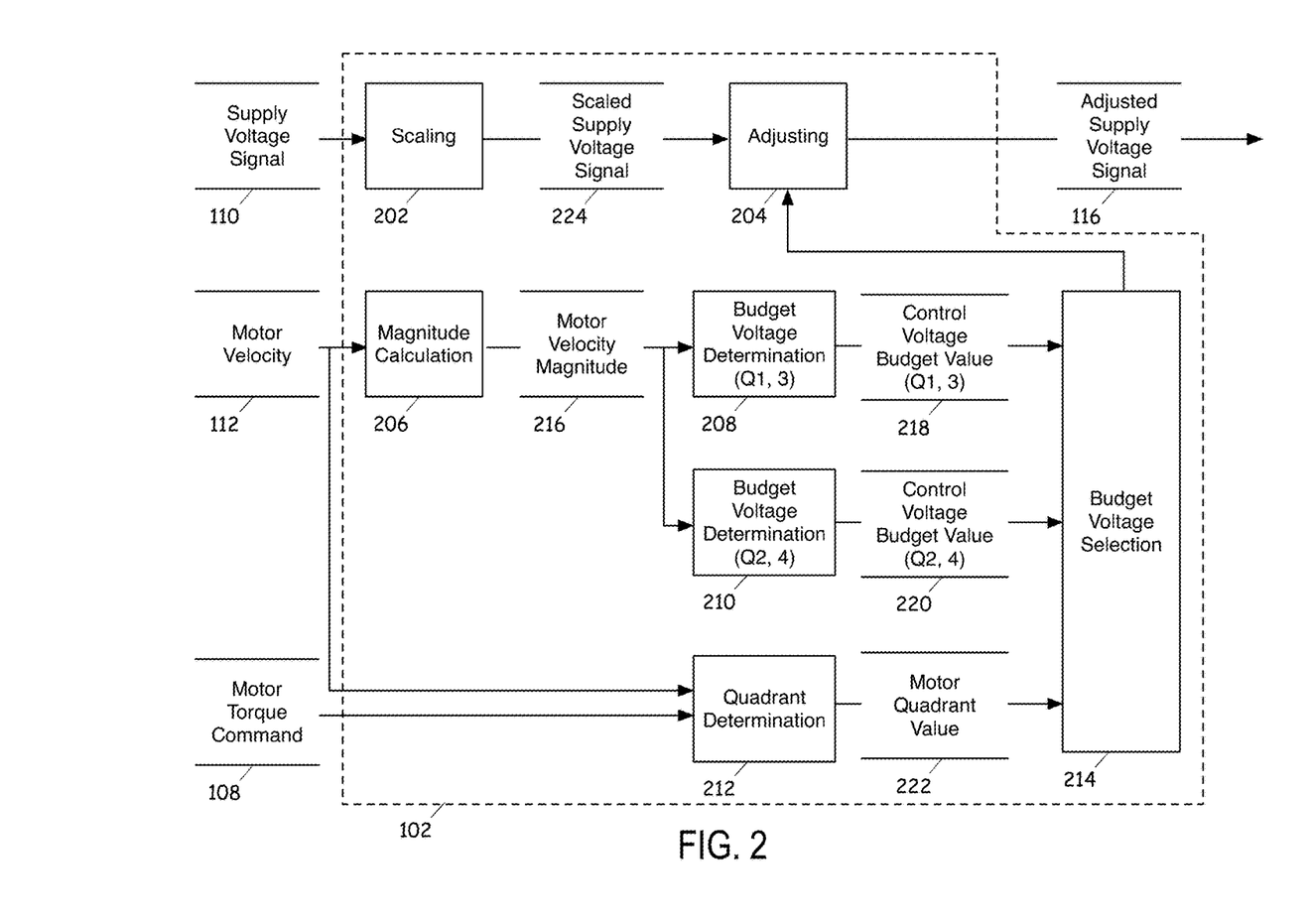
FIG. 2 depicts a control voltage budget determination module in accordance with exemplary embodiments of the invention.

FIG. 2 illustrates a schematic diagram of the control voltage budget determination module 102 of FIG. 1 in accordance with exemplary embodiments of the invention.

As shown, the control voltage budget determination module 102 may include submodules such as a scaling module 202, an adjusting module 204, a magnitude calculation module 206, budget determination modules 208 and 210, a quadrant determination module 212, and a budget voltage selection module 214.

Figure 3:
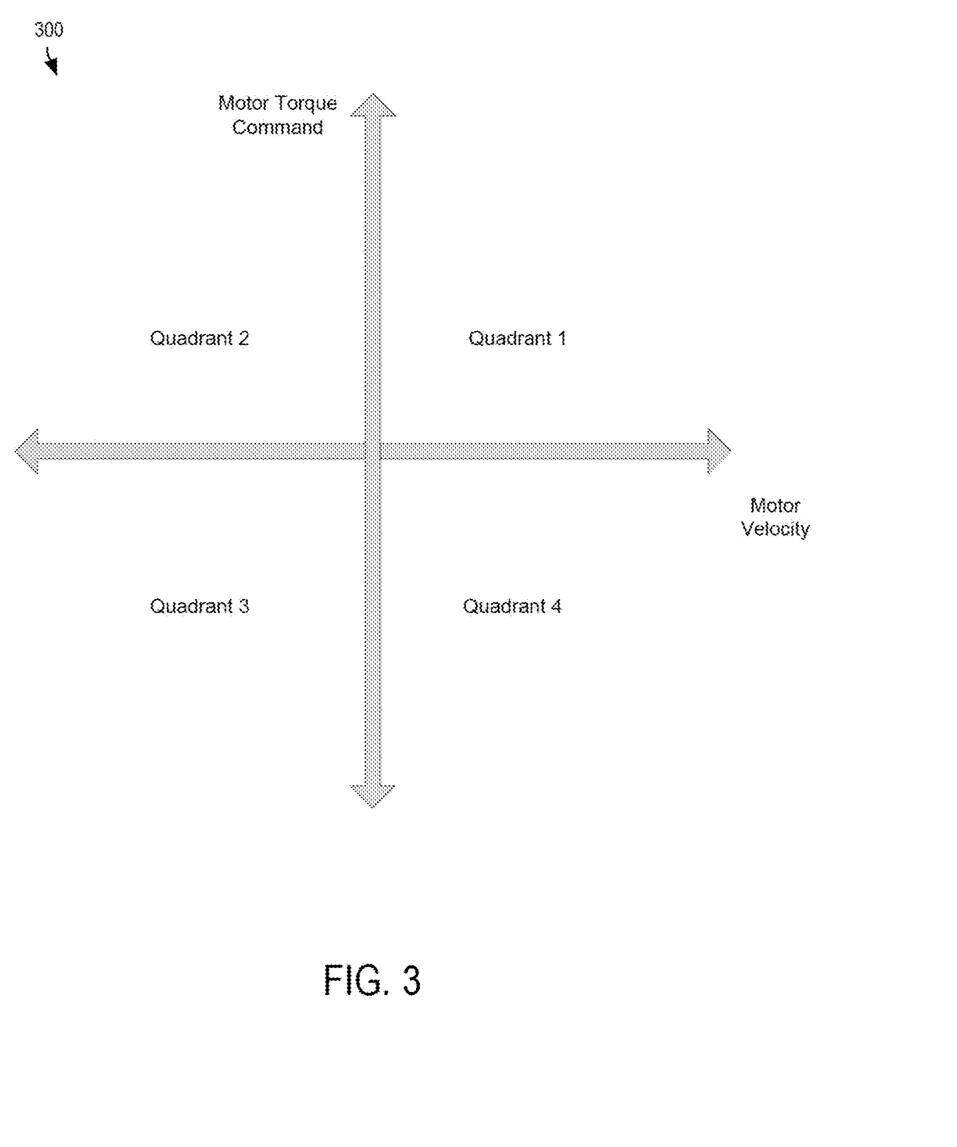
FIG. 3 depicts a graph showing a motor quadrant of operation in accordance with exemplary embodiments of the invention.

The quadrant determination module 212 determines a motor quadrant value 222 based on the motor torque command 108 and the motor velocity signal 112. A motor quadrant, in some embodiments, is a number between one and four that represents the relationship between the motor torque command 108 and the motor velocity 112. FIG. 3 shows a graph 300 having the four quadrants. The first quadrant (quadrant 1) indicates that both motor torque command 108 and the motor velocity signal 112 are the positive rotational direction of the motor 126. The second quadrant (quadrant 2) indicates that the motor torque command is in the positive rotational direction while the motor velocity signal 112 is in the negative rotational direction. The third quadrant (quadrant 3) indicates that indicates that both motor torque command 108 and the motor velocity signal 112 are the negative rotational direction of the motor 126. The fourth quadrant (quadrant 4) indicates that the motor torque command is in a negative rotational direction while the motor velocity signal 112 is in the positive rotational direction. In other words, the first and third quadrants indicate that both of the motor torque command 108 and the motor velocity signal 112 are in the same rotational direction, while the second and fourth quadrants indicate that the motor torque command 108 and the motor velocity signal 112 are in different rotational directions.

Referring back to FIG. 2, the magnitude calculation 206 takes a magnitude or an absolute value of the motor velocity signal 112. The motor velocity magnitude 216 of the motor velocity signal 112 is then supplied to the budget voltage determination modules 208 and 210. The budget voltage determination module 208 determines a control voltage budget value 218 for quadrants 1 and 3 based on the motor velocity magnitude 216 and/or the motor load (not shown) of the motor 126. Specifically, in some embodiments, the budget voltage determination module 208 uses a lookup table for quadrants 1 and 3. In this lookup table, different control voltage budget values are indexed by different motor velocity magnitude values, to determine control voltage budget value for the motor velocity magnitude 216. In some embodiments, the budget voltage determination module 208 calculates the control voltage budget value 218 as a function of the motor velocity magnitude 216.

Similarly, the budget voltage determination module 210 determines a control voltage budget value 220 for quadrants 2 and 4 based on the motor velocity magnitude 216 and/or the motor load. The budget voltage determination module 210 may use a lookup table for quadrants 2 and 4, in which different control voltage budget values are indexed by different motor velocity magnitude values, to determine control voltage budget value for the motor velocity magnitude 216. In some embodiments, the budget voltage determination module 210 calculates the control voltage budget value 218 as a function of the motor velocity magnitude 216.

The budget voltage selection module 214 selects one of the control voltage budget value 218 and the control voltage budget value 220 based on the motor quadrant value 222. That is, if the motor quadrant value 222 indicates the quarter in which the motor 126 is quarter 1 or 3, the budget voltage selection module 314 selects the control voltage budget value 218 determined by the budget voltage determination module 208. If the motor quadrant value 222 indicates the quarter in which the motor 126 is quarter 2 or 4, the budget voltage selection module 316 selects the control voltage budget value 220 determined by the budget voltage determination module 210. The budget voltage selection module 214 sends the selected control voltage budget value 218 or 220 to the adjusting module 204.

Determination and selection of a control budget value is performed by the budget voltage determination modules 208 and 210 and the budget voltage selection 214 using multiple lookup tables or functions. One of the ordinary skill in the art will recognize that determination and selection of a control budget value may also be accomplished by using a single lookup table or a single function. Such a lookup table has different control voltage budget values indexed by different motor velocity magnitude values. Or, the control voltage budget values may be calculated as a function of the motor velocity magnitude 216 and the motor quadrant value 222.

The control voltage budget values in the lookup table(s) are predetermined through analysis as a function of the control loop bandwidth, the dynamic response characteristics and/or other control loop requirements, such as the need for addition of a torque ripple cancelling signal. The control voltage budget values are predetermined based on the expected voltage transients required from the closed loop current control in the current regulator module 106. These expected transients vary with respect to multiple aspects of the control system design, such as the motor parameters 114 (e.g., $K_e$ R $L_q$ and $L_d$), the control loop bandwidth and/or the control loop requirements.

The predetermined values of the control voltage budget would be zero at and near zero motor velocity (i.e., within a threshold difference from zero motor velocity), with gradually increasing values as the motor velocity increases and the control loop voltage requirements approach the supply voltage limit. The zero voltage budget value may be maintained to a higher motor velocity in quadrants 2 and 4 versus quadrants 1 and 3, as the motor BEMF (back electromagnetic force) voltage adds to the supply voltage in quadrants 2 and 4.

The scaling module 202 is an optional module of the control voltage budget determination module 102 and scales the supply voltage signal 110 with a calibration value in order to account for inverter switching dead time. Due to the dead time characteristics of some inverter designs, the full supply voltage may not be available to apply to the motor. The scaling allows the supply voltage signal 110 to uniquely reflect that behavior. A typical value for this calibration scale factor would be 0.99. The scaling module 202 sends the scaled supply voltage signal 224 to the adjusting module 204.

The adjusting module 204 adjusts the scaled supply voltage signal 322 or the supply voltage signal 110 using the control voltage budget value selected by the budget voltage selection 314. Specifically, in some embodiments, the adjusting module 204 subtracts the selected control voltage budget value from the scaled supply voltage signal 322 or the supply voltage signal 110 to generate the adjusted supply voltage signal 116.

Figure 4:
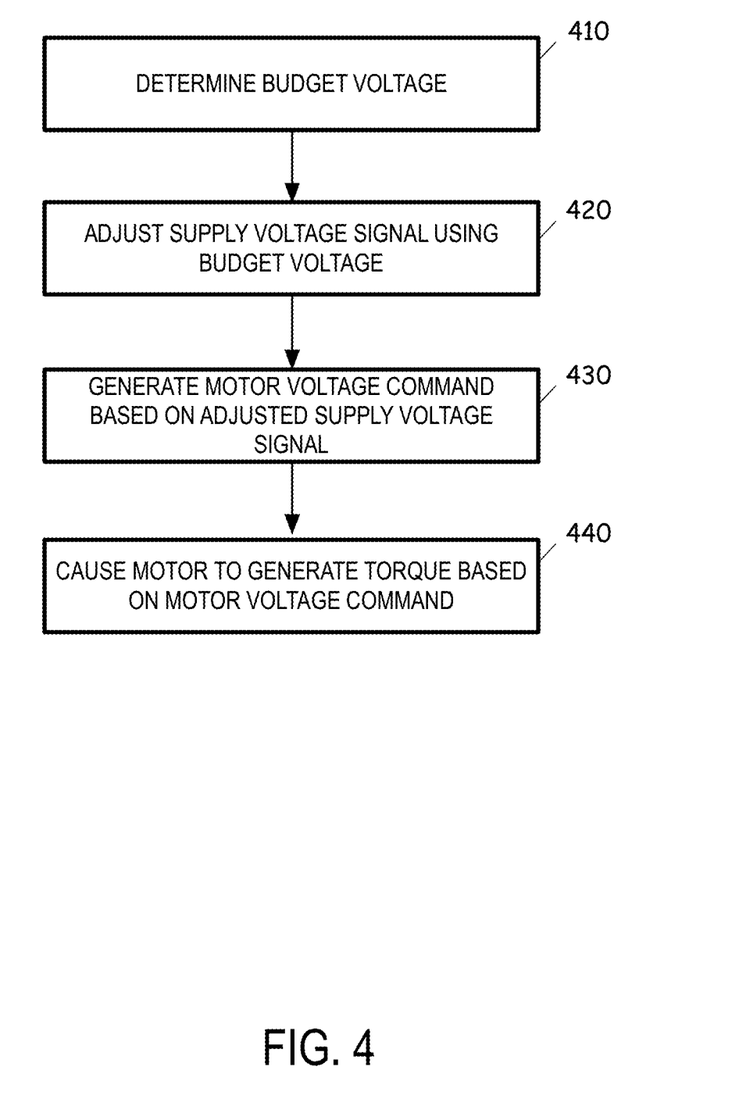
FIG. 4 is flow diagram illustrating a control method for controlling an electric motor in accordance with exemplary embodiments of the invention.

FIG. 4 is a flow diagram for a control method that can be performed by the motor control system 100 in accordance with some embodiments of the invention. As can be appreciated in light of the disclosure, the order of operation within the method is not limited to the sequential execution as illustrated in FIG. 4, but may be performed in one or more varying orders as applicable and in accordance with the present disclosure.

At block 410, the system 100 determines a control voltage budget value based on an operating region of the motor, which, in some embodiments, includes at least one of a motor quadrant, a motor velocity, and a motor load. In some embodiments, the system 100 determines the motor quadrant based on signs of the motor torque command and the motor velocity.

In some embodiments, the system 100 determines the control voltage budget value by using a lookup table in which different control voltage budget values are indexed by different motor quadrant values and different motor velocity values. The control voltage budget values in the lookup table are predetermined through analysis as a function of at least one of a control loop bandwidth and dynamic response characteristics. The control voltage budget values in the lookup table are predetermined to be zeros for motor velocity values that are within a threshold difference from a zero motor velocity and to be gradually larger values as the motor velocity increases and control loop voltage requirements approach a supply voltage limit. The control voltage budget value for a particular motor torque command value and a particular motor velocity value is larger when the motor torque command and the motor velocity are in a same rotational direction of the motor than the control voltage budget value is when the motor torque command and the motor velocity are in different rotational directions of the motor.

In some embodiments, the system 100 determines the control voltage budget value by directly calculating through a functional relationship the control voltage budget value as a function of the motor quadrant and the motor velocity, instead of using a lookup table.

In some embodiments, the motor is a DC brushless motor. In other embodiments, the motor is a DC brush motor. In some such embodiments, the system 100 sets the control voltage budget value to a constant regardless of the operating region of the motor.

At block 420, the system 100 adjusts a supply voltage signal based on the control voltage budget value. Specifically, in some embodiments, the system 100 adjusts the control voltage budget by subtracting the control voltage budget value from the supply voltage signal. In some embodiments, the system 100 may also scale the supply voltage signal with a scale factor prior to adjusting the supply voltage signal in order to account for inverter switching dead time.

At block 430, the system 100 determines a motor voltage command based on the adjusted supply voltage signal. At block 440, the system 100 causes the motor to generate torque based on the motor voltage command. That is, the system 100 applies a voltage corresponding to the motor voltage command to the motor in order to generate a desired motor torque.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of controlling a motor in a motor control system, the method comprising:
   receiving a supply voltage signal and a motor torque command, the motor torque command specifying a desired motor torque to be generated by an electric motor;
   determining a control voltage budget value based on an operating region of the motor, the control voltage budget value being a retained portion of an available supply voltage;
   adjusting the supply voltage signal based on the control voltage budget value by subtracting the control voltage budget value from the supply voltage signal;
   determining a reference current command based on the adjusted supply voltage signal; and
   applying the reference current command to a current regulator, the current regulator configured to generate a motor voltage command to the motor based on the reference current command, the motor voltage command configured to cause the motor to generate the desired motor torque.

2. The method of claim 1, wherein the adjusted supply signal is less than the received supply voltage signal, and adjusting the supply voltage signal comprises subtracting the control voltage budget value from the supply voltage signal.

3. The method of claim 1, wherein the reference current command has a value such that, in combination with the adjusted supply signal, the current regulator causes the motor to achieve a desired voltage.

4. The method of claim 3, wherein determining the control voltage budget value comprises using a lookup table in which different control voltage budget values are indexed by different motor quadrant values and different motor velocity values.

5. The method of claim 4, wherein the control voltage budget values in the lookup table are predetermined through analysis as a function of at least one of a control loop bandwidth and dynamic response characteristics.

6. The method of claim 4, wherein the control voltage budget values in the lookup table are predetermined to be zeros for motor velocity values that are within a threshold difference from a zero motor velocity and to be gradually larger values as the motor velocity increases and control loop voltage requirements approach a supply voltage limit.

7. The method of claim 3, wherein determining the control voltage budget value comprises calculating the control voltage budget value as a function of a motor quadrant and a motor velocity.

8. The method of claim 3, wherein the current regulator is configured to perform a closed loop feedback control, the closed loop feedback control including receiving a measured motor current and generating the motor voltage command based on the reference current command and the measured motor current.

9. The method of claim 1, wherein the control voltage budget value for a particular motor torque command value and a particular motor velocity value is larger when the motor torque command and the motor velocity are in a same rotational direction of the motor than the control voltage budget value is when the motor torque command and the motor velocity are in different rotational directions of the motor.

10. The method of claim 1, wherein the motor is a DC (direct current) brush motor, wherein the determining the control voltage budget value comprises setting the control voltage budget value to a constant regardless of the operating region of the motor.

11. A motor control system, comprising:
a motor;
a control module configured to:
   receive a supply voltage signal and a motor torque command, the motor torque command specifying a desired motor torque to be generated by an electric motor;
   determine a control voltage budget value based on an operating region of the motor, the control voltage budget value being a retained portion of an available supply voltage;
   adjust the supply voltage signal based on the control voltage budget value by subtracting the control voltage budget value from the supply voltage signal;
   determine a reference current command based on the adjusted supply voltage signal; and
   apply the reference current command to a current regulator, the current regulator configured to generate a motor voltage command to the motor based on the reference current command, the motor voltage command configured to cause the motor to generate the desired motor torque.

12. The system of claim 11, wherein the control module is configured to adjust the supply voltage signal by subtracting the control voltage budget value from the supply voltage signal.

13. The system of claim 11, wherein the operating region of the motor comprises at least one of a motor quadrant, a motor velocity, and a motor load.

14. The system of claim 13, wherein the control module is configured to determine the control voltage budget value by using a lookup table in which different control voltage budget values are indexed by different motor quadrant values and different motor velocity values.

15. The system of claim 14, wherein the control voltage budget values in the lookup table are predetermined through analysis as a function of at least one of a control loop bandwidth and dynamic response characteristics.

16. The system of claim 14, wherein the control voltage budget values in the lookup table are predetermined to be zeros for motor velocity values that are within a threshold difference from a zero motor velocity and to be gradually larger values as the motor velocity increases and control loop voltage requirements approach a supply voltage limit.

17. The system of claim 13, wherein the control module is further configured to determine the motor quadrant based on signs of the motor torque command and the motor velocity.

18. The system of claim 11, wherein the control voltage budget value for a particular motor torque command value and a particular motor velocity value is larger when the motor torque command and the motor velocity are in a same rotational direction of the motor than the control voltage budget value is when the motor torque command and the motor velocity are in different rotational directions of the motor.

19. The system of claim 11, wherein the motor is a DC (direct current) brush motor, wherein the determining the control voltage budget value comprises setting the control voltage budget value to a constant regardless of the operating region of the motor.

20. The system of claim 11, wherein the control module is further configured to scale the supply voltage signal with a scale factor prior to adjusting the supply voltage signal in order to account for inverter switching dead time.

* * * * *